United States Patent
Nivala et al.

(10) Patent No.: US 10,496,603 B2
(45) Date of Patent: Dec. 3, 2019

(54) METHOD AND AN APPARATUS AND A COMPUTER PROGRAM PRODUCT FOR STORING ELECTRONIC OBJECTS FOR OFFLINE USE

(71) Applicant: M-Files Oy, Tampere (FI)

(72) Inventors: Antti Nivala, Pirkkala (FI); Paivi Yli-Olli, Tampere (FI); Ari Laaja, Nokia (FI)

(73) Assignee: M-FILES OY (FI)

( * ) Notice: Subject to any disclaimer, the term of this patent is extended or adjusted under 35 U.S.C. 154(b) by 540 days.

(21) Appl. No.: 14/584,186

(22) Filed: Dec. 29, 2014

(65) Prior Publication Data

US 2016/0188616 A1   Jun. 30, 2016

(51) Int. Cl.
*G06F 16/13*   (2019.01)
*G06F 16/93*   (2019.01)
*G06F 16/28*   (2019.01)

(52) U.S. Cl.
CPC ............ *G06F 16/13* (2019.01); *G06F 16/289* (2019.01); *G06F 16/93* (2019.01)

(58) Field of Classification Search
CPC ........ G06F 3/067; G06F 3/0619; G06F 3/065; G06F 17/30174; G06F 17/30575
See application file for complete search history.

(56) References Cited

U.S. PATENT DOCUMENTS

| | | | | |
|---|---|---|---|---|
| 7,734,584 B1* | 6/2010 | McBarron | ......... | G06F 17/30067 707/622 |
| 8,170,995 B2* | 5/2012 | Prahlad | ............ | G06F 17/30622 707/673 |
| 2004/0215600 A1* | 10/2004 | Aridor | .................. | G06F 16/986 707/999.003 |
| 2005/0149481 A1* | 7/2005 | Hesselink | ........... | H04L 63/0209 707/999.001 |
| 2007/0185879 A1* | 8/2007 | Roublev | ........... | G06F 17/30073 707/999.01 |
| 2008/0077571 A1* | 3/2008 | Harris | ............... | G06F 17/30864 707/999.005 |
| 2008/0250024 A1* | 10/2008 | Kvm | ................. | G06F 17/30132 707/999.01 |
| 2013/0007028 A1* | 1/2013 | Alkov | ................... | G06F 17/301 707/758 |
| 2013/0138608 A1* | 5/2013 | Smith | ............... | G06F 17/30575 707/610 |
| 2015/0199414 A1* | 7/2015 | Braginsky | ......... | G06F 17/30132 707/613 |

* cited by examiner

*Primary Examiner* — Yuk Ting Choi
(74) *Attorney, Agent, or Firm* — Ware, Fressola, Maguire & Barber LLP

(57) ABSTRACT

The invention relates to a method for an information management system storing electronic objects being associated with metadata having properties, the method comprising determining a first condition, wherein the first condition specifies a value for a metadata property; determining a second condition; determining if an electronic object has the value specified in the first condition in the electronic object's metadata; and if so determining if the electronic object fulfills the second condition; and if so storing the electronic object to a local storage.

23 Claims, 6 Drawing Sheets

METHOD AND AN APPARATUS AND A COMPUTER PROGRAM PRODUCT FOR STORING ELECTRONIC OBJECTS FOR OFFLINE USE

TECHNICAL FIELD

The present application relates to a content management system. In particular, the present application relates to offline use of electronic objects.

BACKGROUND

Enterprise Information Management (EIM) system refers to a system organizing and storing organization's electronic content, such as documents and other business-related objects and/or structural data. EIM system may comprise enterprise content management (ECM) systems, content management systems (CMS), document management systems (DMS) and data management systems. Such systems comprise various features for managing electronic content, e.g. storing, versioning, indexing, searching for and retrieval of documents, and for defining structural data. In addition, the system comprises structural data. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

SUMMARY

Now there has been invented an improved method and technical equipment implementing the method for storing objects of the content management system for offline use. Various aspects of the invention include a method, an apparatus, a server, a client and a computer readable medium comprising a computer program stored therein, which are characterized by what is stated in the independent claims. Various embodiments of the invention are disclosed in the dependent claims.

According to a first aspect, there is provided a method for an information management system storing electronic objects being associated with metadata having properties, the method comprising, determining a first condition, wherein the first condition specifies a value for a metadata property; determining a second condition; determining if an electronic object has the value specified in the first condition in the electronic object's metadata; and if so determining if the electronic object fulfills the second condition; and if so storing the electronic object to a local storage.

According to a second aspect, there is provided an apparatus comprising at least one processor, memory storing electronic objects being associated with metadata having properties, said memory further including computer program code, the memory and the computer program code configured to, with the at least one processor, cause the apparatus to perform at least the following: determine a first condition, wherein the first condition specifies a value for a metadata property; determine a second condition; determine if an electronic object has the value specified in the first condition in the electronic object's metadata; and if so determine if the electronic object fulfills the second condition; and if so store the electronic object to a local storage.

According to a third aspect, there is provided an information management system comprising at least one processor, memory storing electronic objects being associated with metadata having properties, said memory further including computer program code, the memory and the computer program code configured to, with the at least one processor, cause the system to perform at least the following: determine a first condition, wherein the first condition specifies a value for a metadata property; determine a second condition; determine if an electronic object has the value specified in the first condition in the electronic object's metadata; and if so determine if the electronic object fulfills the second condition; and if so store the electronic object to a local storage.

According to a fourth aspect, there is provided a computer program product embodied on a non-transitory computer readable medium, comprising computer program code configured to, when executed on at least one processor, cause an apparatus or a system to: determine a first condition, wherein the first condition specifies a value for a metadata property; determine a second condition; determine if an electronic object being stored in an information management system has the value specified as the first condition in the electronic object's metadata; and if so determine if the electronic object fulfills the second condition; and if so store the electronic object to a local storage.

According to an embodiment, the second condition specifies another value for a metadata property, wherein for fulfilling the second condition, the electronic object has the another value in the electronic object's metadata.

According to an embodiment, the second condition is determined from a predefined rule.

According to an embodiment, the predefined rule specifies the amount of electronic objects that are to be stored to the local storage, wherein the method comprises filtering a set of electronic objects fulfilling the first condition according to the predefined rule.

According to an embodiment, the method further comprises determining a third condition from a predefined rule.

According to an embodiment, the predefined rule specifies the amount of electronic objects that are to be stored to the local storage, wherein the method comprises filtering a set of electronic objects fulfilling the first condition and the second condition according to the predefined rule.

According to an embodiment, the predefined rule also specifies a sorting order for the electronic objects, according to which the set of the electronic objects is determined.

According to an embodiment, the first condition is determined from a user input.

According to an embodiment, the user input is targeted to a selection of an object.

According to an embodiment, the local storage is usable in offline mode.

According to an embodiment, the object fulfilling the first condition is one of the following group: an object having a direct property matching the first condition; an object having an indirect property matching the first condition; or an object having a recursively referred property matching the first condition.

According to an embodiment, the object fulfilling the second condition is one of the following group: an object having a direct property matching the second condition; an object having an indirect property matching the second condition; or an object having a recursively referred property matching the second condition.

According to an embodiment, the method further comprises removing the objects from the local storage after a certain time period.

According to an embodiment, the method further comprises removing the objects from the local storage as a response to a remote swipe request.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of enterprise information management system. It is to be noted, however, that the invention is not limited to enterprise information management systems. In general, the present embodiments relate to local storage of objects in a mobile environment (i.e. where a mobile client application is used as an application for accessing data in the information management system). Particularly, the present embodiments relate to offline use of objects in a mobile environment (i.e. where the aforementioned local storage is an offline storage for a mobile client), which offline use is controlled by metadata—particularly one or more property values—of objects.

Metadata is a set of properties, which set of properties comprises one or more properties having values. A property may have one or more values. In dynamic content management systems, objects do not have a static location in a certain static folder. In dynamic content management systems, folders are so called virtual folders, which are created dynamically based on certain metadata properties. Because static folders do not exist in dynamic content management systems, no static paths to such folders exist either. Therefore, metadata for an object in the dynamic content management system typically does not comprise information on object's location in a folder.

Information management system (also known as data management system or content management system), such as enterprise content management systems (ECM), for example, a quality management system (QMS), a document management system (DMS), a customer relationship management system (CRM), can store data either statically or dynamically. The present embodiments relate to a dynamic system.

Figure 1B:
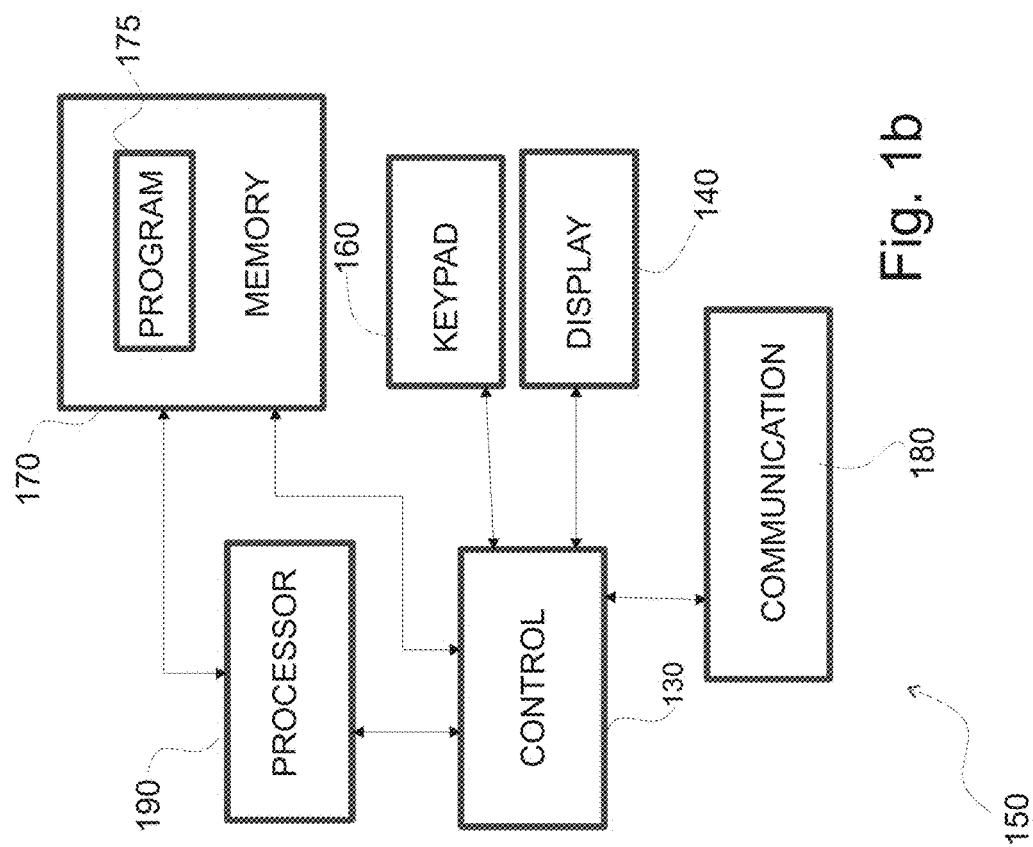
FIG. 1b shows an embodiment of an apparatus.
Figure 1A:
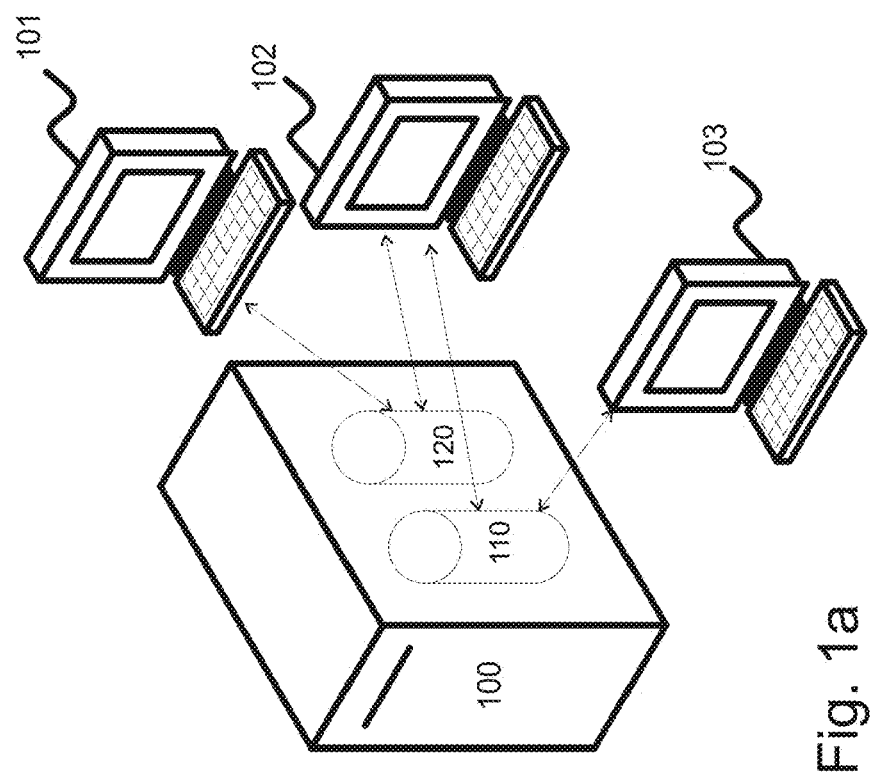
FIG. 1a shows an embodiment of a content management system.

FIG. 1a illustrates an enterprise content management system according to an embodiment. The system comprises at least one server 100 for storing electronic objects. The server may be a so called on-premises server or a cloud server or their combination. The electronic objects may be stored in one or more data vaults 110, 120. One or more client devices 101, 102, 103 can access said at least one server 100 in order to work with the stored electronic objects. For example, a client device may check out an object, wherein a user of the client device may modify the checked-out object. After modification, the user of the client device checks the object in the vault again, wherein the object is available to other users. The client device may be a personal computer, a mobile device, a laptop, a tablet device, or any computer device. The content stored in the server is used through an application, wherein the application may be universal for all types of client devices, or there can be a client device specific content management application for each device, e.g. a mobile application, a web-based application, a desktop application. In addition, the server device 100 may have its own server application.

An apparatus according to an embodiment is illustrated in FIG. 1b in simplified manner. The apparatus 150 may represent a server device 100 or a client device 101, 102, 103 of FIG. 1a. The apparatus 150 comprises processing means, such as a processor 190 for processing data. The apparatus 150 further comprises memory means, such as a memory 170, storing computer program code 175, applications and various electronic data. The apparatus 150 comprises controlling means, such as a control unit 130, for controlling functions in the apparatus 150. The control unit 130 may run a user interface software to facilitate user control of at least some functions of the apparatus 150. The control unit 130 may also deliver a display command and a switch command to a display 140 to display visual information, e.g. a user interface. The control unit 130 may communicate with the processor 190 and can access the memory 170. Further, the apparatus 150 may comprise input means e.g. in a form of a keypad 160. Yet further, the apparatus 150 comprises various data transfer means, such as a communication block 180 having a transmitter and a receiver for connecting to a network and for sending and receiving information. The communication means can be adapted for telecommunications and/or wide-range and/or short range communication.

An object in a dynamic content management system is a representation of any data. The object may have relationship with (i.e. refers to/is referred by) other objects. The dynamic data management system has a metadata structure that defines the semantics for the data. The metadata structure defines metadata for different objects as well as relationships between objects.

Figure 2:
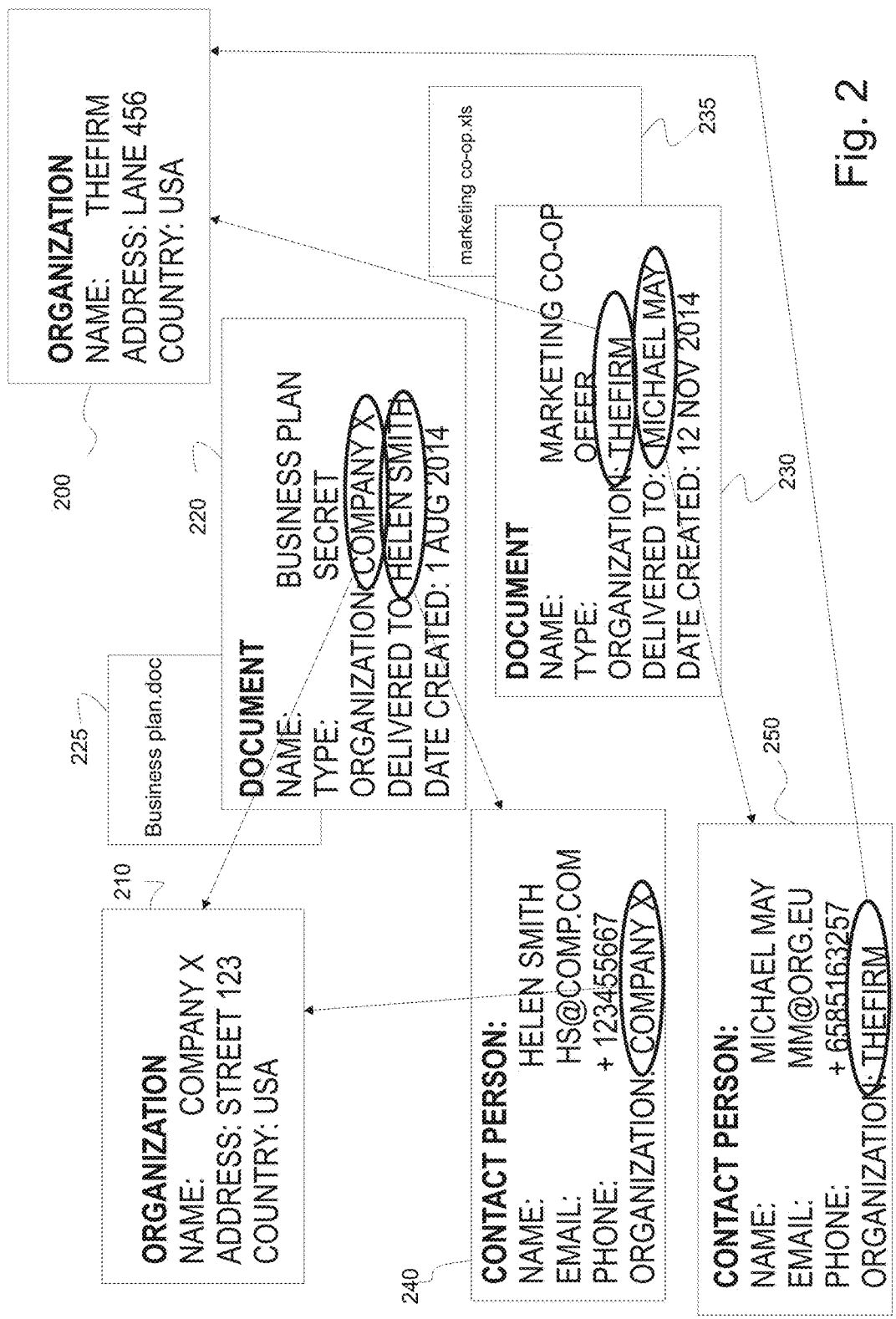
FIG. 2 shows examples of objects and their relationships to other objects.

FIG. 2 illustrates examples of objects. An example of an object is an organization 210, having properties (i.e. metadata) for a name; an address; a country. An example of another object is a document 220, 230, having properties (i.e. metadata) for a name; a type; an organization; delivered to; a date created. An example of yet another object is a contact person 240, 250, having properties (i.e. metadata) for a person name; an email address; a phone number; an organization. The values for the metadata properties can be defined manually by typing a value (e.g. HS@COMP.COM in object 240) to a value field. Alternatively, the property can be a look-up type, which means that possible values for the property can be selected from a predefined list of values. For example, a document object 220 comprises a look-up type property "type" having a value "secret". The value "secret" has been selected from a list of values (not show in FIG. 2) comprising—for example—values "Published", "Secret", "Offer", "Agreement". As a further alternative, some of the properties may be given values automatically by the system (e.g. properties such as date created, last modified, last used, creator, last modified by, etc.) In addition to metadata, the objects may contain a content file. For example, a document object 220, 230 may contain a file 225, 235 that has been created with a certain application, such as an application from Microsoft Office, Notepad, OpenOffice, and stored in a corresponding file format.

The relationships for the objects can be created by defining metadata references between objects. FIG. 2 further illustrates an example of how relationships between objects can be defined. In general, a relationship is generated by using a value of a metadata property as a reference. For example, a document object 220 refers to an organization object 210 via metadata "Organization" whose value is Company X. Similarly, a document object 230 refers to an organization object 200 via metadata "Organization" whose value is Thefirm. Document objects 220, 230 also refer to objects "contact person" 240, 250 respectively via metadata "Delivered to" whose value is either Helen Smith or Michael May. Similarly, objects for contact person 240, 250 has a reference to organization objects 210, 200 via corresponding metadata values. It is appreciated that by changing any of the metadata values that are used as a reference to another object, the reference will be changed accordingly. For example, if a value for Organization property for Helen Smith as a contact person object 240 was changed to be Thefirm, then the contact person object Helen Smith would refer to Organization object 200 instead of Organization object 210. It is appreciated that references can be simply defined by selecting a value from a predefined list of values for a look-up type property. In such case, the relationship will be correct.

As mentioned, in a dynamic content management system, any data can be represented as objects. This means that also any configuration data or functions may be represented as objects, and may also be processed as objects which can be referred by other objects.

Figure 3:
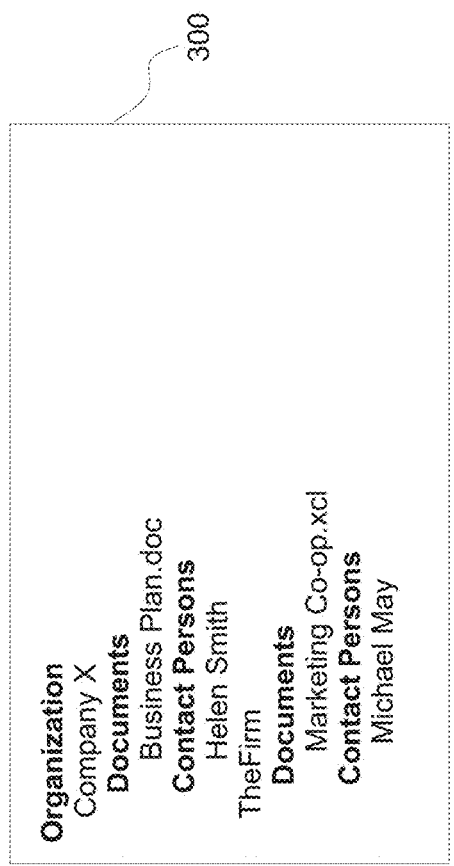
FIG. 3 shows another example of objects and their relationships to other objects.

FIG. 3 illustrates a simplified example of a view 300 for organizations. Such a view 300 lists organization objects stored in the content management system (such as Company X and TheFirm from FIG. 2). In addition, the view 300 shows all the related objects, i.e. such objects that refer to an organization object. As shown in FIG. 2, the related objects for "Company X" and "TheFirm" are contact persons "Helen Smith" and "Michael May" and documents "Business Plan" and "Marketing Co-op" correspondingly. These related objects are also shown in the view 300.

Figure 4:
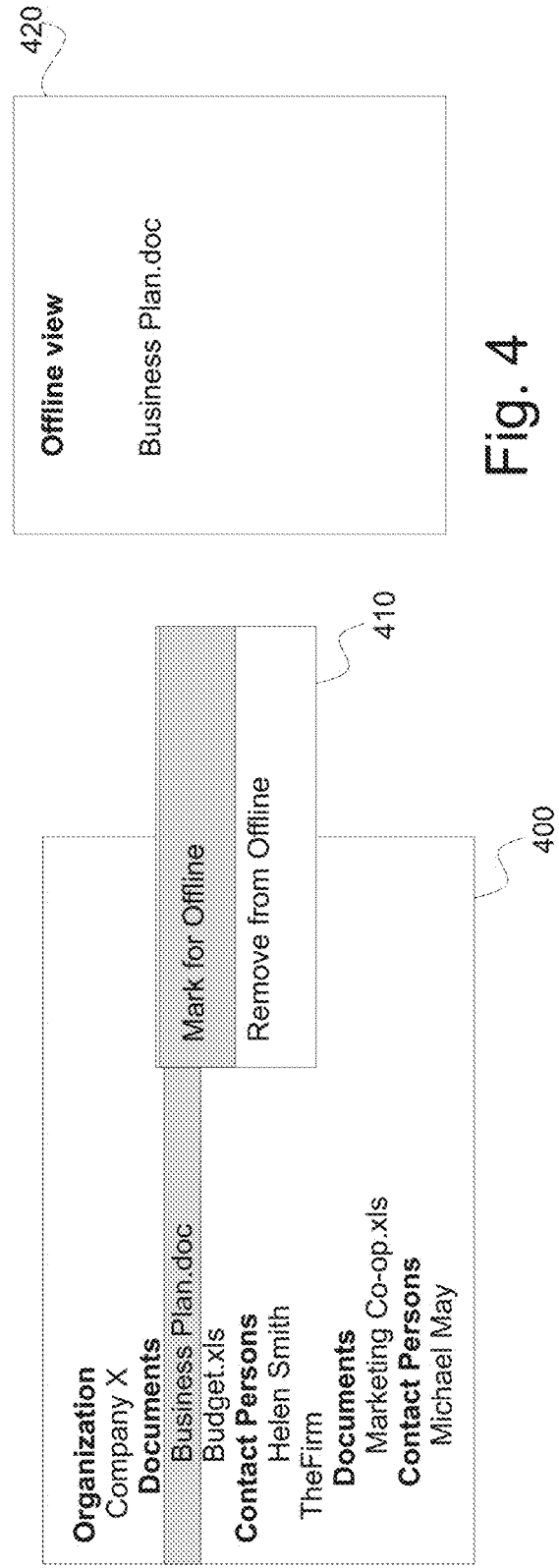
FIG. 4 shows a known embodiment for marking an object for offline availability.

In general, a content management system is used by client devices through a network connection, i.e. online. However, the content management systems provide functionalities that enable use of data stored in a content management system also offline, i.e. when the client device is disconnected from the content management server. A general implementation of an offline functionality in a content management system, such as in M-Files® content management system, is discussed next. While being in an online mode, i.e. the client device is connected to a content management server, the user is able to mark certain objects to be available offline. This is illustrated by FIG. 4, where a view 400 lists organizations "Company X", "TheFirm", and their related objects as shown also in FIG. 3. For marking a document ("Business Plan.doc" in FIG. 4) for offline availability, the user simply selects a functionality "Mark for Offline Availability" from a menu 410 being provided e.g. when a user selects a document with a secondary click (e.g. a right-click) of a used pointing device (e.g. a mouse). Functionality "Mark for Offline Availability" downloads the document (i.e. "Business Plan") in the content management system to an application specific storage representing an offline view 420. In such storage, the user can access the object when the client device is not connected to the server. It is appreciated that only "Business Plan.doc" is provided to offline view 420, and not the other objects or documents. By marking one or more other objects individually for offline use, the user is able to store further objects in the offline storage.

Present embodiments relate to a use of offline mode in mobile environment. This means that the content management system is used by a mobile device, i.e. mobile client. Prior to the present embodiments, mobile clients have required a network connection in order to access the data in the content management system. Due to the present embodiments, the network connection is not needed, but the data can be marked for offline availability also with mobile clients.

Figure 5:
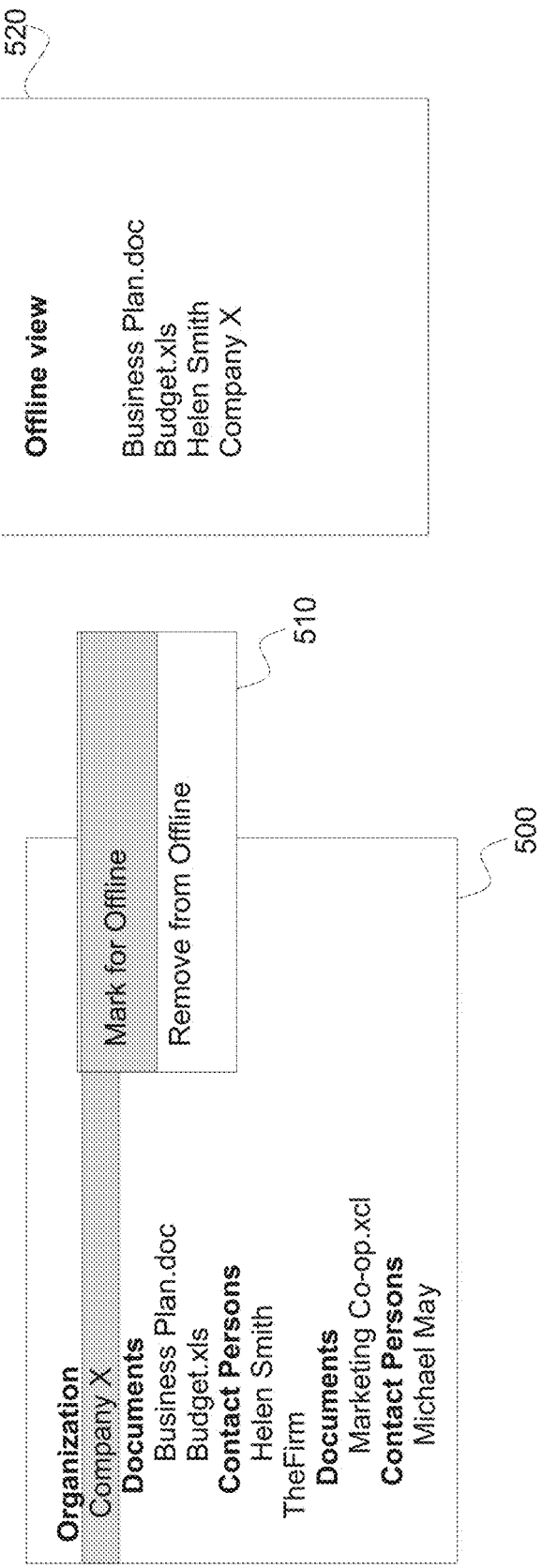
FIG. 5 shows an embodiment of the invention for marking objects for offline availability.

According to an embodiment, when an object is marked for offline availability, any other related object will also become available for offline. This is illustrated in FIG. 5. FIG. 5 shows a view 500 for organizations. The user marks an organization "Company X" for offline availability. Due to the marking, all the objects that are directly related to "Company X" are retrieved to the offline view 520. Such objects are "Business Plan.doc", "Budget.xls", "Helen Smith" and "Company X". It is realized from FIG. 2 that all these objects (Budget.xls not shown in FIG. 2) comprise a metadata property having value "Company X". Therefore, a certain property value of an object defines whether an object is marked for offline availability. In addition, when the user marks an organization "Company X" for offline availability, all the objects that are indirectly (not shown in FIG. 5) related to "Company X" may be retrieved to the offline view. Indirect relationship of objects is discussed later.

This can be implemented by
  receiving a selection of an object (e.g. Company X) for offline availability (i.e. to be stored locally);
  determining other (directly/indirectly related) objects that have a property value corresponding to the selected object;
  storing at least the determined other objects to an offline storage location.

In addition to the direct and indirect references (relationships), the related objects may be determined recursively. For example, if a user marks "Company X" for offline availability, any project objects X and Y that are related to Company X are then also marked for offline availability. Yet further, any documents and other objects being related to project objects X and Y, are also recursively marked for offline availability. This recursion can be unlimited, or the recursion can be limited to a certain depth (e.g. 0, 1, 2, . . . ), and/or it can be limited based on certain metadata condition (being discussed later).

When the amount of related objects is small, the processing capabilities of a mobile device will be enough. But, when the amount of the processable data increases, i.e. an object that is marked for offline availability is related to thousands of other objects, processing of the data by a mobile client may slow down or result in other problems. For example, the network connection may have limited bandwidth or total usage restrictions, the storage capacity of the mobile device may be small, or additional charges may be applied by the network connection provider based on the amount of use of the network connection.

To address such problems, the amount of objects in the offline storage may be limited by various means. For example, a limit on the total number of objects to retrieve to offline storage may be imposed (e.g. maximum of 50 or 5,000 objects), or the total amount of data that needs to be transferred or stored can be limited (e.g. maximum of 10 megabytes or 1 gigabyte of data). After the limit has been reached, the mobile device may stop retrieving and storing additional objects. However, such means for controlling which objects are retrieved and stored to offline storage are static by nature and often do not serve the business needs of the user in the best possible way. Instead of such limitations, when retrieving and storing all identified objects for offline storage is not desirable, the user may wish to retrieve and store the most important or most relevant objects for offline use.

Therefore the present embodiments provide a further solution, where another metadata value (in addition to the one relating to the selected object) may also be used for controlling whether or not a certain object is marked for offline availability.

Figure 6:
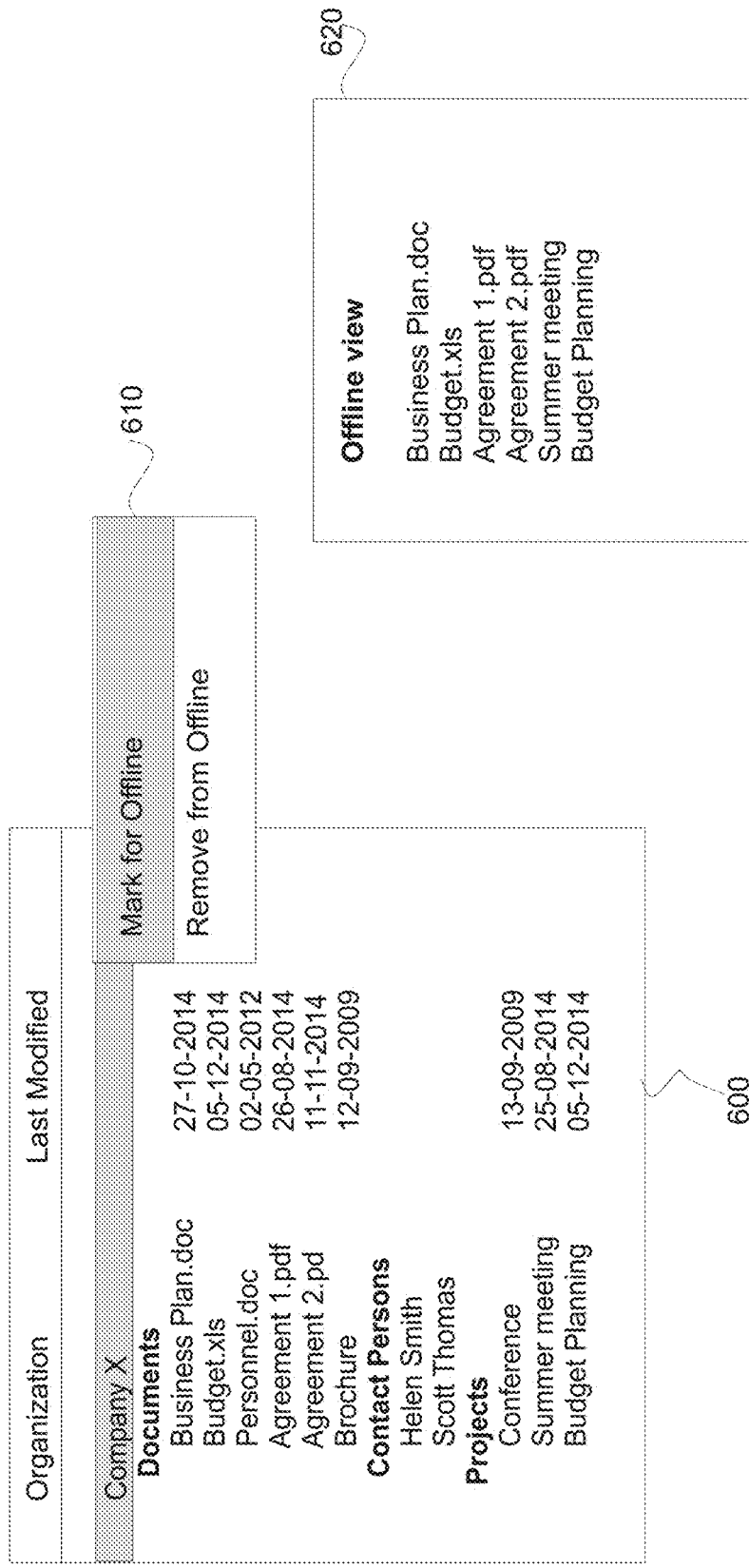
FIG. 6 shows another embodiment of the invention for marking objects for offline availability.

This further embodiment has been illustrated in FIG. 6. FIG. 6 shows a view 600 for an organization "Company X". The view 600 displays other objects that are related to the organization "Company X". In addition, the view 600 shows a column "Last modified", into which values of "Last modified" property of an object are retrieved. It is realized that e.g. Business Plan.doc has been modified 27 Oct. 2014, whereas project "Budget Planning" has been modified on 5 Dec. 2014. According to the first embodiment (shown in FIG. 5), marking of "Company X" for offline availability stores all the related objects to an offline storage location. However, according to this further embodiment, another metadata property of an object further determines whether or not to store the object for offline use. In this example, the other metadata property is "Last modified" found from metadata of each object.

In this embodiment, it has been defined that any object being modified within six months from the date the related object is marked for offline availability, is also marked for offline availability. Such a definition may have been defined in the system configuration, or alternatively, this could be prompted from the user at the time the user marks an object or multiple objects for offline use. Yet, as a further alternative, it can be a user-defined setting in the mobile device, or it can be a system-level setting in the server application or in the data repository. Due to such configuration, when a user marks "Company X" for offline availability, any object that is related to "Company X" and has been modified within six months from the current day (in this example 15 Dec. 2014), is also automatically marked for offline availability.

Therefore, the offline view 620 will contain objects "Business Plan.doc", "Budget.xls", "Agreement 1.pdf", "Agreement 2.pdf", "Summer Meeting" and "Budget Planning".

Instead of the "Last modified" property, any other property or a combination of properties may be used for completing the requirements of objects for the offline availability. An example of another property is "Creator", wherein any object being created by e.g. current user is marked for offline availability when the related object is marked for offline availability. Another example of yet another property is "Document type", wherein any object being e.g. "Offer" as Document type, is marked for offline availability when the related object is marked for offline availability.

Another example of another property is "Relevance", which describes the relevance or importance of an object with a numeric value or by other means. In this example, any object for which the Relevance property has a value higher than a certain threshold is marked for offline availability when the related object is marked for offline availability.

Other examples are a property "Accessed by", which contains information on the user or users who have accessed the object, and a property "Accessed at (timestamp)", which contains information on the dates and times the object has been accessed by a user or users. In these examples, any object that meets criteria defined by one or more such other properties, or a combination of such other properties, is marked for offline availability when the related object is marked for offline availability.

Such another property may also be indirect metadata property of the object. For example, if a document object D1 has a property "Project", referring to a project object Project ABC, and Project ABC has a property "In progress" with a value Yes, then one can consider this to be indirect metadata property of the document D1 and this indirect metadata property could be denoted with a dotted syntax as [Project].[In progress]. Indirect metadata of an object can be used for controlling the retrieval and storing of the object for offline use. For example, when an organization Company X is marked for offline availability, instead of marking all related objects of Company X for offline availability, only those related objects of Company X for which the indirect metadata [Project].[In progress] is Yes would be marked for offline availability. It is worth pointing out that indirect metadata is dynamic by its nature and the concrete values of indirect metadata vary from object to object. For example, two documents D1 and D2, both with a property "Organization" with the value Company X may have different values for their "Project" properties, e.g., the value of the "Project" property for D1 is Project ABC and the value of the "Project" property for D2 is Project XYZ. If the value of the "In progress" property for Project ABC is Yes and the value of the "In progress" property for Project XYZ is No, then in the previous example D1 would be marked for offline availability because it is a related object of Company X and for D1 [Project].[In progress] is Yes, but D2 would not be marked for offline availability because even though it is a related object of Company X, for D2 [Project].[In progress] is No and therefore it does not meet the additional criteria in the example.

In some cases specifying a metadata-based rule such as "all objects where [Last modified] is within 6 months from today" or similar criteria, as described above, is not necessarily the optimal way of controlling which objects are retrieved and stored for offline use, because the resulting amount of objects and data is difficult to predict in advance. To address this problem, the present embodiments provide a further solution, where the total number of objects and/or the total amount of data is restricted (e.g., up to 500 objects and up to 100 megabytes of data) and the determination of which objects that meet the selection criteria are eventually retrieved and stored for offline use is based on a sorting order defined by one or more direct or indirect metadata properties.

For example, when an organization Company X is marked for offline availability and the system determines that there are 10,000 related objects for Company X but there is a configured limitation of up to 500 objects for offline retrieval, the system will follow a configured sorting order that is based on the "Last modified" property and will retrieve and store the 500 most recently modified related objects of Company X for offline use. Another example is using a "Relevance" property for retrieving and storing a specified number of most relevant objects for offline use. Similarly, any other property or a combination of multiple properties may be used for determining the priority in which objects are retrieved and stored for offline use until the configured total limitations are reached. Such property or properties may be direct or indirect metadata of the objects, or a combination thereof.

In some cases it is desirable to prevent certain objects from being retrieved for offline use. The user or a system administrator may specify exclusion criteria that defines which objects shall not be retrieved for offline use even if they meet the criteria otherwise. Such exclusion criteria may be specified separately in the mobile device or on the server side, or it can be specified together with the inclusion criteria by using Boolean logic. Such exclusion criteria may, for example, specify that files with a file size greater than a specific threshold are not to be retrieved for offline use.

In practice, the marking for offline availability stores the objects to an offline storage in the mobile device, which offline storage is specific to the used mobile client application. The objects in the offline storage may be encrypted. The offline storage stores the objects until the objects are removed from the offline use. According to an embodiment, the removal is performed manually (FIG. 6 menu 610 "Remove Offline Availability"). However, according to another embodiment, the offline storage in a mobile client application may have a functionality for automatic expiration. An automatic expiration removes the objects from the offline storage without a need for manual removal. This reduces the risk of a data leak if a mobile device is stolen or the mobile device is lost. The automatic expiration can be configured to occur after a certain time (e.g. every 24 hours, every two days, etc.) In addition or instead, the automatic expiration can be implemented as a response to remote swipe request. A remote swipe need inquiry is transmitted from the mobile device to the server at the time the mobile device re-connects to the server. As a response to the remote swipe need inquiry, the server sends to the mobile device a remote swipe request, which performs swiping of the data from the local storage of the mobile device.

Marking for offline availability may retrieve and store the matching objects for offline use immediately, or the retrieval and storing may take place at a later time, and these operations may either be foreground operations that the user needs to wait for, or background operations during which time the user may continue using the mobile device and application for other purposes.

The set of objects that meet the offline availability criteria may vary by time. For example, if the value of the "Last modified" property of a document D1 is currently 1 Jan. 2000, the document D1 does not currently meet the criteria "[Last modified] is within 6 months from today". However, if any user now modified the document D1, the value of the "Last modified" property of D1 is updated and the document D1 now fulfills that criteria. To ensure that the appropriate objects at any time are available for offline use, the mobile device may periodically re-evaluate the set of objects that should be retrieved and stored for offline use. If any additional objects are found to meet the criteria, the mobile device may retrieve and store such objects for offline use. If any of the objects that are currently stored for offline use no longer meet the criteria, the mobile device may remove such objects from the offline storage. This periodic refreshing or updating of the offline content may take place on a time interval basis or by other basis, for example, at appropriate usage points of the mobile application such as when the user launches the application, performs a specific action in the application, closes the application, or switches to another application, or if the application has been idle for a specific amount of time. The application may also provide an explicit command that the user can use to request the refreshing of offline content.

The application may provide an indication to the user about the current status of offline content. The available indications may vary, but may include status information in the form of text, color indicators or other similar means, indicating to the user if the offline content in the mobile device is currently up to date (e.g., "green light") or not up to date (e.g., "red light") or partially up to date with some content available but some not (e.g., "yellow light"). This kind of indications help the user determine if it is safe to switch off the network connection.

In the previous, the embodiments being discussed relate to offline use of objects in mobile environment, where a user selects an object, after which any object relating to the selected objects (and fulfilling a predefined metadata conditions) are marked for offline availability.

Other functionalities that are suitable in the mobile environment relate to control of amount of data. As discussed earlier, the mobile device may stop retrieving objects after a certain limit has been reached. However, such a limitation can be implemented based on metadata as well.

For example, in a desktop client of the application, any object (i.e. all the objects) fulfilling the metadata conditions can be marked for offline availability without data restrictions. For example, all the objects having matching properties with "Last accessed within 30 days" or "Project=Project ABC" can be marked for offline availability.

Because—as discussed above—the mobile devices may have limited processing/data transfer capability, such an unlimited retrieval of objects would not be very usable. Therefore, the present embodiments further provide a solution for restricting such unlimited retrieval of objects according to a maximum amount (X) of objects that are to be retrieved for offline use. This means that only the first X objects fulfilling the metadata conditions are marked for offline availability, where the X pieces are selected according to a certain metadata based criteria.

This can be implemented by defining an offline rule stating that "X objects that have been accessed by a user recently" are marked for offline availability. Whereupon, the X objects are selected according to the metadata property "Accessed" in such a manner that regardless of the amount of the objects that have been accessed by the user, only the first X objects that have been accessed recently are marked for offline availability. This would define a metadata condition (i.e. [Accessed by]=this user), for objects that should be marked for offline availability, but also a sorting condition according to which the first X objects are selected (e.g. first 50 objects when matching objects are sorted in descending order by [Accessed at (timestamp)]).

This embodiment expands the basic embodiment being discussed above in such a manner, that there is no requirement for selecting a certain object by a user, but instead (or in addition) there is a predefined (by a user or by an administrator or system specific) offline rule. Such offline rule can then be implemented by the client application when needed. For example, if the client application notices interferences in network connection, the client application may implement the offline rule to secure the data availability if the network connection cuts off.

It is appreciated that the previous embodiments are related to offline use of object, which generally refers to lack of network connection. It is however possible to utilize the above teachings also while being online. This means that even if there is an available network connection, the application may store certain (e.g. recently accessed) objects locally to the mobile device (to a storage resembling the offline storage location). This may speed up the access to the objects. By understanding this, it is appreciated that the present embodiments are not solely for marking objects for offline availability. Rather, the embodiments are for controlling which objects are needed locally (i.e. stored locally either for offline use or online use) wherein the control is metadata based control.

When the objects are stored locally either in offline mode or online mode, the user is able to modify the objects in the local storage. The modified objects are updated to the server. If the device is offline, the updating is implemented at the time the network connection is formed. If the device is online, the updating can be implemented when the object is checked in from the modification, or when the object is removed from the local storage.

Any conflict occurring with updates (i.e. received from several users) can be resolved in various ways. For example, the client application may give a user a possibility to reject user's own modifications, or to reject another user's modifications, or to save user's own modifications as a different version of the object (i.e. a copy of the object), or to synchronize the modifications with other modifications.

Figure 7:
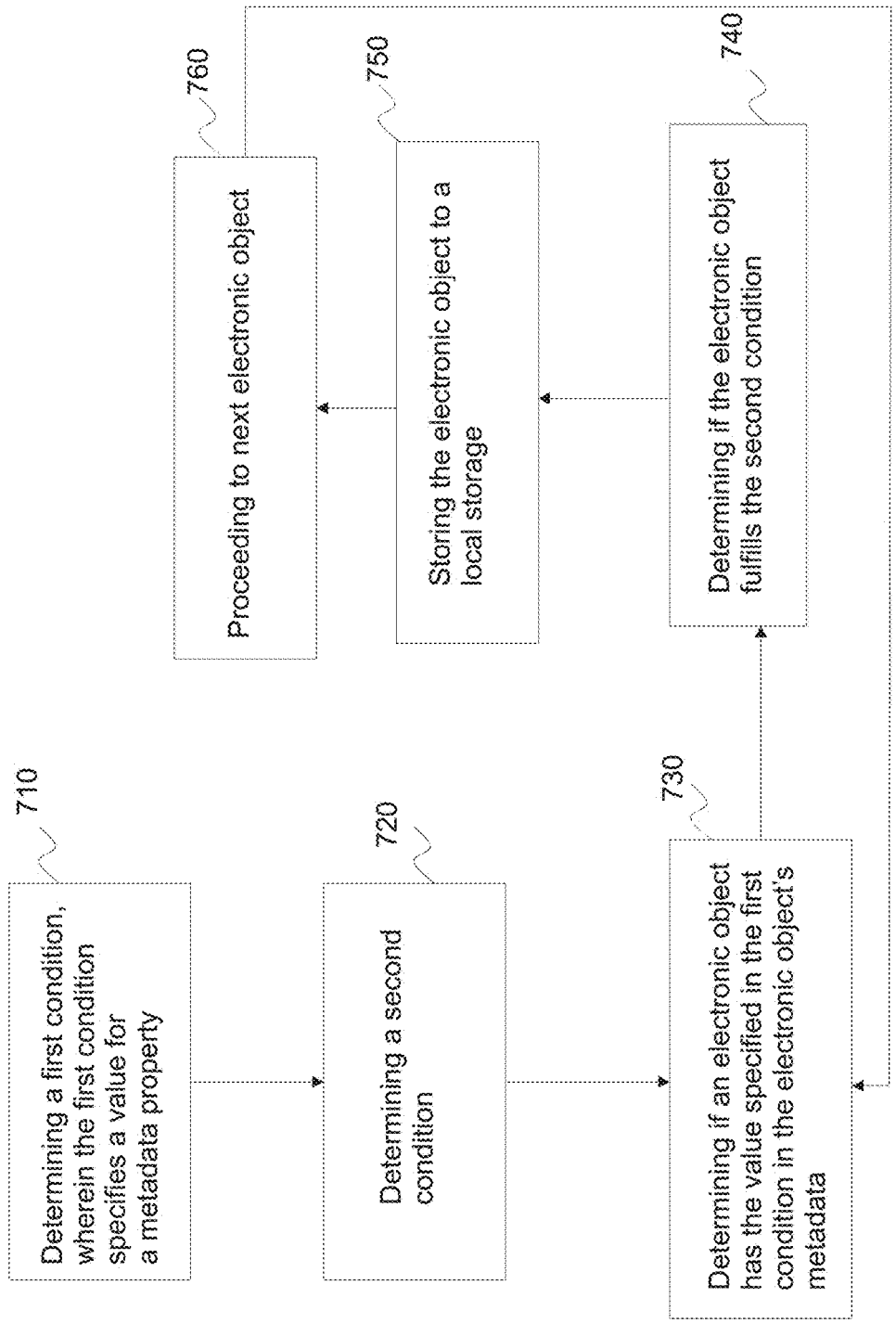
FIG. 7 is a flowchart of a method according to an embodiment.

A method according to an embodiment is illustrated in a flowchart in FIG. 7. The method comprises determining a first condition, wherein the first condition specifies a value for a metadata property 710. Then, a second condition is determined 720. The second condition may be another value for a metadata property. Alternatively, the second condition may be determined from a predefined rule, said rule specifying a total amount of electronic objects being stored to a local folder. In that case, the electronic objects are then filtered according to a sorting order being also specified in the predefined rule. The method comprises determining 730 if an electronic object has the value specified in the first condition in the electronic object's metadata; and if so determining 740 if the electronic object fulfills the second condition. If the electronic object fulfills the second condition, the electronic object is stored 750 to a local storage. The method continues from the step 730 for the next electronic object.

According to an embodiment, the method comprises determining a third condition, wherein a first and second condition may specify values for metadata properties and wherein the third condition may be determined from a predefined rule. The predefined rule may specify a total amount of electronic objects being stored to a local folder. The electronic objects are then filtered according to a sorting order being also specified in the predefined rule. This means, that any object having the property values of the first and second condition, and fulfilling the predefined rule of the third condition, is stored to a local storage.

The various embodiments may provide advantages. The embodiments save memory of the client device, which is advantageous especially with computing devices with lower processing capability. The embodiments also improve performance since only the most relevant data is defined for offline storage. In addition, the embodiments improve data transfer. Even though the present embodiments are disclosed by using a mobile environment as an example, the present embodiments are applicable also with other client applications, such as a desktop client application or other native client application or web client application.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is apparent that the present invention is not limited solely to the above-presented embodiments, but it can be modified within the scope of the appended claims.

The invention claimed is:

1. A method for an information management system storing electronic objects in virtual folders in a server, said electronic objects being associated with metadata having properties with values, wherein the method comprises:

dynamically creating a virtual folder based on a certain value in the metadata property of electronic objects, so that any electronic object having said certain value in the metadata property is automatically viewed in said virtual folder;

configuring a client device to access the electronic objects in the server via a network connection;

receiving from a user of the client device a selection of an electronic object in a virtual folder to mark the electronic object to be available offline, due to which a virtual folder for offline use is created;

determining a first relevant metadata value corresponding to the marked electronic object;

determining one or more other objects that have a metadata property having a first relevant metadata value;

determine one or more other objects that do not have a metadata property having the first relevant metadata value, but that refers by means of another metadata value to an object having a metadata property having the first relevant metadata value;

receiving a user input defining a second relevant metadata value;

filtering out such other electronic objects from the one or more other objects whose metadata do not satisfy the second relevant metadata value; and storing the determined electronic objects in the virtual folder for offline use in a local storage of the client device.

2. The method according to claim 1, wherein a third condition is determined from a predefined offline rule.

3. The method according to claim 2, wherein the predefined offline rule further specifies the amount of electronic objects that are to be stored to the local storage, wherein the method comprises filtering a set of electronic objects fulfilling the first and second relevant metadata values according to the predefined rule.

4. The method according to claim 2, wherein the predefined offline rule also specifies a sorting order for the electronic objects, according to which the set of the electronic objects is determined.

5. The method according to claim 1, wherein the local storage is usable in offline mode.

6. The method according to claim 1, wherein the object fulfilling the relevant metadata value is one of the following group: an object having a direct property matching the first relevant metadata value; an object having an indirect property matching the first relevant metadata value; or an object having a recursively referred property matching the first relevant metadata value.

7. The method according to claim 1, wherein the object fulfilling the second relevant metadata value is one of the following group: an object having a direct property matching the relevant metadata value; an object having an indirect property matching the relevant metadata value; or an object having a recursively referred property matching the relevant metadata value.

8. The method according to claim 1, further comprising removing the objects from the local storage after a certain time period.

9. The method according to claim 1, further comprising removing the objects from the local storage as a response to a remote swipe request.

10. An apparatus for an information management system comprising at least one processor, memory storing electronic objects in virtual folders, said electronic objects being associated with metadata having properties with values, wherein a virtual folder is dynamically created based on a certain value in the metadata property of electronic objects, so that any electronic object having said certain value in the metadata property is automatically viewed in said virtual folder, and wherein the apparatus is configured to have a network connection with a client device for enabling the client device to access the electronic objects in the server, said memory further including computer program code, the memory and the computer program code configured to, with the at least one processor, cause the apparatus to perform at least the following:
  receive from a user of the client device a selection of an electronic object to mark the electronic object in a virtual folder to be available offline, due to which a virtual folder for offline use is created;
  determine a first relevant metadata value corresponding to the marked electronic object;
  determine one or more other objects that have a metadata property having a first relevant metadata value;
  determine one or more other objects that do not have a metadata property having the first relevant metadata value, but that refers by means of another metadata value to an object having a metadata property having the first relevant metadata value;
  receive a user input defining a second relevant metadata value;
  filter out such other electronic objects from the one or more other objects whose metadata do not satisfy the second relevant metadata value; and
  store the determined electronic objects in the virtual folder for offline use in a local storage of the apparatus.

11. The apparatus according to claim 10, wherein the apparatus is configured to determine a third condition from a predefined offline rule.

12. The apparatus according to claim 11, wherein the predefined offline rule further specifies the amount of electronic objects that are to be stored to the local storage, wherein the apparatus is configured to filter a set of electronic objects fulfilling the first relevant metadata value according to the predefined rule.

13. The apparatus according to claim 11, wherein the predefined offline rule also specifies a sorting order for the electronic objects, according to which the set of the electronic objects is determined.

14. The apparatus according to claim 10, wherein the local storage is usable in offline mode.

15. The apparatus according to claim 10, wherein the object fulfilling the first relevant metadata value is one of the following group: an object having a direct property matching the first relevant metadata value; an object having an indirect property matching the first relevant metadata value; or an object having a recursively referred property matching the first relevant metadata value.

16. The apparatus according to claim 10, wherein the object fulfilling the second condition is one of the following group: an object having a direct property matching the second relevant metadata value; an object having an indirect property matching the second relevant metadata value; or an object having a recursively referred property matching the second relevant metadata value.

17. The apparatus according to claim 10, wherein the apparatus is configured to remove the objects from the local storage after a certain time period.

18. The apparatus according to claim 10, wherein the apparatus is configured to remove the objects from the local storage as a response to a remote swipe request.

19. An information management system comprising at least one processor, memory storing electronic objects in virtual folders in a server, the electronic objects being associated with metadata having properties with values, wherein a virtual folder is dynamically created based on a certain value in the metadata property of electronic objects, so that any electronic object having said certain value in the metadata property is automatically viewed in said virtual folder, and wherein the server is configured to have a network connection with a client device for enabling the client device to access the electronic objects in the server, said memory further including computer program code, the memory and the computer program code configured to, with the at least one processor, cause the system to perform at least the following:
  receive from a user of the client device a selection of an electronic object in a virtual folder to mark the electronic object to be available offline, due to which a virtual folder for offline use is created;
  determine a first relevant metadata value corresponding to the marked electronic object;
  determine one or more other objects that have a metadata property having a first relevant metadata value;
  determine one or more other objects that do not have a metadata property having the first relevant metadata value, but that refers by means of another metadata value to an object having a metadata property having the first relevant metadata value;
  receive a user input defining receive a user input defining a second relevant metadata value;
  filtering out such other electronic objects from the one or more other objects whose metadata do not satisfy the second relevant metadata value; and
  store the determined electronic objects in the virtual folder for offline use in a local storage of the client device.

20. A computer program product for an information management system embodied on a non-transitory computer readable medium, comprising computer program code and electronic objects in virtual folders, the electronic objects being associated with metadata having properties with values, wherein a virtual folder is dynamically created based on a certain value in the metadata property of electronic objects, so that any electronic object having said certain value in the metadata property is automatically viewed in said virtual folder, and wherein the electronic objects in the server are accessible by a client device via a network connection, wherein the computer program code is configured to, when executed on at least one processor, cause an apparatus or a system to:

receive from a user of the client device a selection of an electronic object to mark the electronic object in a virtual folder to be available offline, due to which a virtual folder for offline use is created;

determine a first relevant metadata value corresponding to the marked electronic object;

determine one or more other objects that have a metadata property having a first relevant metadata value;

determine one or more other objects that do not have a metadata property having the first relevant metadata value, but that refers by means of another metadata value to an object having a metadata property having the first relevant metadata value;

receive a user input defining a second relevant metadata value;

filter out such other electronic objects from the one or more other objects whose metadata do not satisfy the second relevant metadata value; and store the determined electronic objects in the virtual folder for offline use in a local storage of the client device.

21. The method according to claim 2, wherein the predefined offline rule also specifies a sorting order for the electronic objects, according to which the set of the electronic objects is determined.

22. The apparatus according to claim 11, wherein the predefined offline rule also specifies a sorting order for the electronic objects, according to which the set of the electronic objects is determined.

23. The method according to claim 1, further comprising storing content of the local storage to the information management system when the network connection is formed and removing the objects from the local storage.

* * * * *